United States Patent [19]

Matsui et al.

[11] 4,390,351
[45] Jun. 28, 1983

[54] GAS-LIQUID SEPARATOR

[75] Inventors: Kunio Matsui; Hiroaki Tsuchiya, both of Yokohama; Ryushi Suzuki, Tokyo, all of Japan

[73] Assignee: Ishikawajima-Harima Jukogyo Kabushiki Kaisha, Tokyo, Japan

[21] Appl. No.: 312,995

[22] Filed: Oct. 20, 1981

Related U.S. Application Data

[63] Continuation of Ser. No. 117,524, Aug. 12, 1980, abandoned.

[30] Foreign Application Priority Data

Aug. 16, 1979 [JP] Japan .............................. 54-104210
Apr. 24, 1980 [JP] Japan .............................. 55-56523

[51] Int. Cl.³ ....................... B01D 19/00; B01D 45/16
[52] U.S. Cl. ....................................... 55/204; 55/207; 55/459 B; 55/459 C; 55/461; 210/512.1
[58] Field of Search ................. 55/184, 203, 204, 207, 55/461, 459 B, 459 C; 210/512.1

[56] References Cited

U.S. PATENT DOCUMENTS

| 1,058,393 | 4/1913 | Vaughan | 55/461 |
| 1,306,003 | 6/1919 | Good | 55/461 |
| 1,362,251 | 12/1920 | Kellog | 55/461 |
| 1,649,556 | 11/1927 | Waters | 55/184 |
| 1,958,577 | 5/1934 | Hirshfeld | 55/461 |
| 2,049,578 | 8/1936 | Werts | 55/203 |
| 2,426,327 | 8/1947 | Underwood | 55/461 |
| 2,809,716 | 10/1957 | Gill | 55/461 |
| 3,320,729 | 5/1967 | Stahl | 55/461 |
| 3,766,720 | 10/1973 | Bloom | 55/461 |
| 4,345,920 | 8/1982 | Ross | 55/46 |

FOREIGN PATENT DOCUMENTS

| 1919503 | 10/1970 | Fed. Rep. of Germany | 55/461 |
| 495091 | 3/1976 | U.S.S.R. | 55/207 |
| 639578 | 12/1978 | U.S.S.R. | 55/461 |

Primary Examiner—David L. Lacey
Attorney, Agent, or Firm—B. B. Olive

[57] ABSTRACT

A centrifugal separator for separating gas bubbles from a liquid incorporates a spiral liquid passage with inlet and outlet ends as defined by a top plate, a bottom plate and a strip spirally coiled between the plates and otherwise constructed so that by utilizing the low specific gravity of the bubbles and centrifugal force acting thereon, the bubbles are directed into a bubble trapping compartment for removal.

1 Claim, 11 Drawing Figures

GAS-LIQUID SEPARATOR

This application is a continuation of patent application Ser. No. 117,524, filed Aug. 12, 1980, now abandoned.

BACKGROUND OF THE INVENTION

The present invention relates to a gas-liquid separator.

When bubbles are entrained in industrial water such as boiler water, working liquids (including non-flammable ones) used in hydraulic systems, slurries used in the production of ceramic, slurry-like coating agents used for coating paper, films or tapes, lubricating oils, quenching liquids, chemical solutions, edible liquids, etc., equipment, apparatus or devices handling these liquids are damaged, poor yields result and non-uniform structures occur. In addition, aeration and cavitation cause erosion, noise and degradation of fluids. Therefore bubbles entrained in liquids must be removed.

The prior art gas liquid separators or more specifically bubble separators are shown in FIGS. 1 and 2. With the static tank shown in FIG. 1, liquid entraining bubbles enter through an inlet a into the tank b which is provided with baffles c to define zig-zag channels. While the liquid flows through these channels, bubbles in the liquid are separated by the action of the buoyant force on the bubbles and collected. The liquid free from bubbles flows out through an outlet d. Instead of the baffles, wire mesh or the like may be used.

In the continuous-flow type bubble separator shown in FIG. 2, an inner pipe f extended coaxially of an outer pipe e is bent upright and extended out of the outer pipe e. The bottom of the inner pipe f is provided with many openings g so as to direct the liquid which enters the inner pipe f through an inlet h into the outer pipe e. While the liquid flows through the inner pipe f, bubbles in the liquid are separated and rise by the action of the buoyant force on the bubbles and are discharged through a valve i to the exterior. The liquid free from bubbles flows out through an outlet j.

In the bubble separators shown in FIGS. 1 and 2 bubble or entrainment separation relies on the action of the buoyant force on the bubbles. As a result, in the case of a liquid having a high degree of viscosity, the bubble-liquid separation efficiency is low. In addition, because of the slow rise time of the bubbles, the separators become very large in size.

In order to solve these problems, a bubble separator of the type shown in FIG. 3 has been devised and demonstrated. Disposed at the bottom of a cylindrical chamber k of the bubble separator is an agitator m which has a plurality of fins 1 and is carried for rotation by a shaft n drivingly connected to a motor or the like. A liquid with entrained bubbles is charged through an inlet o opening at the upper portion of the cylindrical chamber k. In the chamber k the liquid is subjected to a flow pattern forming a vortex. As a result, the bubbles in the vortex are forced to rise toward a trap or bubble outlet q and are discharged through a valve r to the exterior. The liquid free from bubbles flows out through an outlet p.

The bubble separator shown in FIG. 3 has a higher bubble separation efficiency than those shown in FIGS. 1 and 2, but has some disadvantages. Firstly, if abrasive particles are entrained in a liquid, a seal s between the rotary shaft n and the bottom of the chamber k is subjected to rapid wear and must be frequently replaced. Secondly, the construction is complex so that the fabrication cost becomes high for general usage. Thirdly, the power for driving the agitator must be provided.

In view of the above, the primary object of the present invention is to provide a gas-liquid or bubble separator which will prevent erosion, noise, degradation of fluids, damage of equipment and poor yields, will positively separate bubbles entrained in a liquid having a high degree of viscosity and will ensure trouble-free operation even when abrasive particles are also entrained in the liquid.

Another object of the present invention is to provide a gas-liquid or bubble separator which is very simple in construction yet capable of positive separation of bubbles from a liquid.

The above and other objects, effects, features and advantages of the present invention will become more apparent from the following description of preferred embodiments thereof taken in conjunction with the accompanying drawings.

DETAILED DESCRIPTION OF THE PREFERRED EMBODIMENTS

Figure 1:
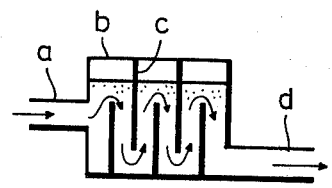
FIGS. 1 through 3 are schematic views of the prior art gas-liquid separators.
Figure 2:
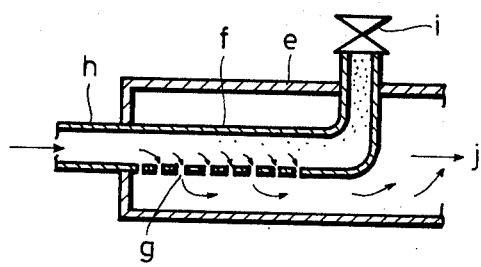
Figure 3:
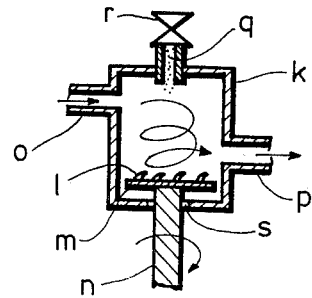
Figure 4:
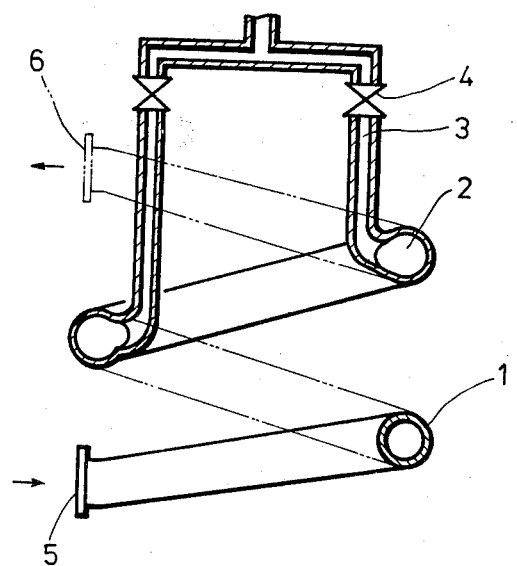
FIG. 4 is an elevation sectional view of a first embodiment of the present invention.

Referring to FIG. 4, a first embodiment of a gas-liquid separator in accordance with the present invention has a concentrically and upwardly coiled channel 1 which is defined by a concentrically and upwardly coiled pipe and a plurality of spaced apart bubble trapping or separating openings 2 are formed through the inner side wall of the uppermost coil. Each bubble trapping opening 2 is connected to a header or the like through a bubble riser 3 with a valve 4.

In operation, a liquid with entrained bubbles is charged through an inlet 5 into the coiled pipe 1 at a high velocity and flows out from a discharge or outlet port 6. When the liquid flows through the coiled pipe 1, it experiences a centrifugal force. The bubbles entrained in the liquid have a specific gravity far smaller than that of the liquid so that they are forced to flow along the radially inward wall of the coiled pipe 1 and enter the bubble trapping holes 2 of the uppermost coil.

Because of the mentioned centrifugal force, the bubbles in the liquid can be positively separated and because the bubble trapping holes 2 are provided in the uppermost coil along the radially inward wall thereof, the radially inwardly separated bubbles can be positively forced to flow into the trapping holes 2 and rise through the bubble risers 3 and valves 4 into the header or the like. From the header or the like the bubbles may be discharged to the exterior.

The liquid which is now free from any bubbles flows out through the outlet 6.

It is to be understood that the present invention is not limited to the embodiment described above with reference to FIG. 4 and that various modifications may be effected without leaving the true spirit of the present invention. For instance, instead of defining the coiled liquid passageway by the concentrically and upwardly coiled pipe 1, a coiled passage, bubble trapping openings and bubble risers may be formed within a solid block. Moreover, the coiled liquid passageway may be defined by concentrically coiled metal, plastic or cast ceramic. The number of coils is also not limited and it may be only one or in the extreme case the fluid passage may be an arc. The cross sectional configuration of the liquid passageway is also not limited to a circle and the liquid passageway may have any suitable cross section. The number and shape of the bubble trapping holes 2 are not limited to those described above. Any suitable number of bubble trapping holes 2 may be provided and the bubble trapping holes 2 may have any suitable shape such as a circle, an elongated ellipse or the like. The arrangement of the bubble risers 3 is also not limited to that described above. It is not necessary to insert the valves 4 in the bubble risers 3, but the provision of these valves is preferable in order to prevent the drainage in excessive quantities of the liquid together with the separated bubbles. That is, the valves 4 are provided in order to provide the resistance to the flow of the liquid in the liquid passageway 1.

Figure 5:
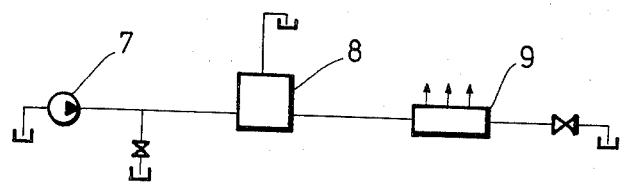
FIG. 5 is a flow chart of a production line incorporating the gas-liquid separator of the present invention.

FIG. 5 is a flow chart of a line for applying a coating material to for example paper or fabric webs or the like. A coating liquid is discharged from a pump 7 and passes through the bubble separator 8 of the present invention. The bubble-free coating liquid flows into a header 9 from which the coating liquid is sprayed over the webs or the like to be treated. Because of the provision of the bubble separator 8, no bubble is entrained in the coating liquid which flows into the header 9.

In the case of a lubrication system, a bubble-free lubricating liquid flows from the bubble separator 8 to parts such as bearings to be lubricated.

In the case of a hydraulic system, the general practice is that the bubble separator is inserted into the return line so that the working liquid which returns to a tank or reservoir may be free from bubbles. Alternatively, the bubble separator may be disposed not at the downstream but upstream of a pump or in the tank or reservoir itself in such a way that after the bubble separation the liquid may be stored in the tank or the like. In such a case, the bubble riser may be connected to the exterior or the upper portion of the tank or the like.

Figure 6:
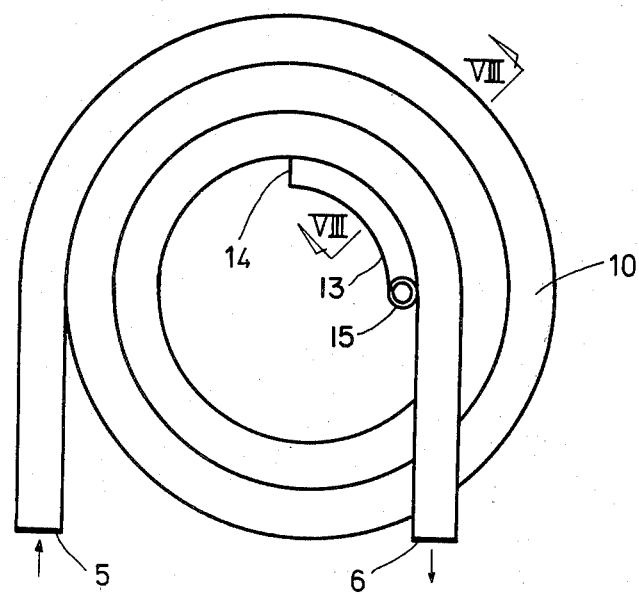
FIG. 6 is a plan view of a second embodiment of the present invention.
Figure 7:
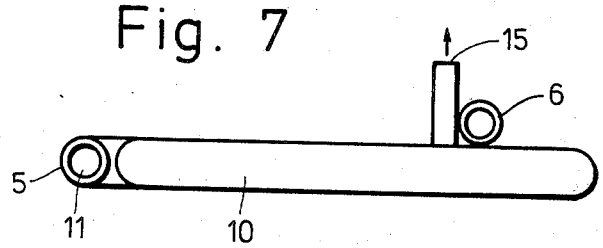
FIG. 7 is a side view of the FIG. 6 embodiment.
Figure 8:
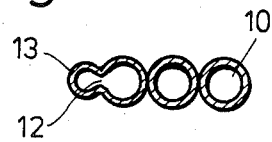
FIG. 8 is a sectional view taken along the line VIII—VIII of FIG. 6.

Next referring to FIGS. 6 through 8, a second embodiment of a gas-liquid separator in accordance with the present invention will be described. A spiral coiled passage 11 is defined by spirally coiling a pipe 10 in such a way that the diameters of respective turns are gradually decreased from an inlet 5 to an outlet 6. An elongated slit 12 is formed through the radially inward wall of the last turn communicated with the outlet 6. A bubble separating pipe 13 has one end thereof sealed with a liquid-tight plug or the like 14 and has an elongated slit 12 of which mates with the elongated or arcuate slit 12 of the last turn. This bubble separating pipe 13 is welded or otherwise joined in a liquid-tight connection to the last turn so that they are communicated with each other through the arcuate slit 12. The inlet 5 and outlet 6 are tangentially extended out of the spiral coil for connection with external pipes. An outlet 15 of the bubble separating pipe 13 is extended upwardly.

The liquid entraining bubbles flows at a high velocity into the spiral coiled pipe 10 from the inlet 5 and out from the outlet 6. Since bubbles have small specific gravity, they are forced toward the radially inward walls of the spiral passage 11 under the centrifugal forces and finally move into the bubble separating pipe 13 in the vicinity of the outlet 6. As a result, the liquid free from bubbles flows out of the outlet 6. The bubbles trapped in the bubble separating pipe 13 are discharged out of the system through the outlet 15.

Instead of the bubble trapping pipe 13, a hollow disk may be welded or otherwise joined to the last turn in a manner substantially similar to that described elsewhere, and a bubble drain pipe or the like may be joined to this disk.

A third embodiment of the present invention will be described with reference to FIGS. 9 and 10. This embodiment is substantially similar in underlying principle to the embodiment described above with reference to FIGS. 6 through 8 except for the construction of the liquid passage. Instead of using the pipe 10, a strip is used to define a spiral liquid passage with a central axis A in a common horizontal plane P (FIG. 10). Specifically, a strip 18 is spirally coiled between an upper or top circular plate 16 and a bottom circular plate 17, whereby a spiral liquid passage 11 rectangular and uniform in cross section is provided as in FIGS. 9 and 10. The starting end 19 of the spiral passage 11 is closed with a liquid-tight end plate 20 and is communicated with an inlet pipe 21.

Figure 9:
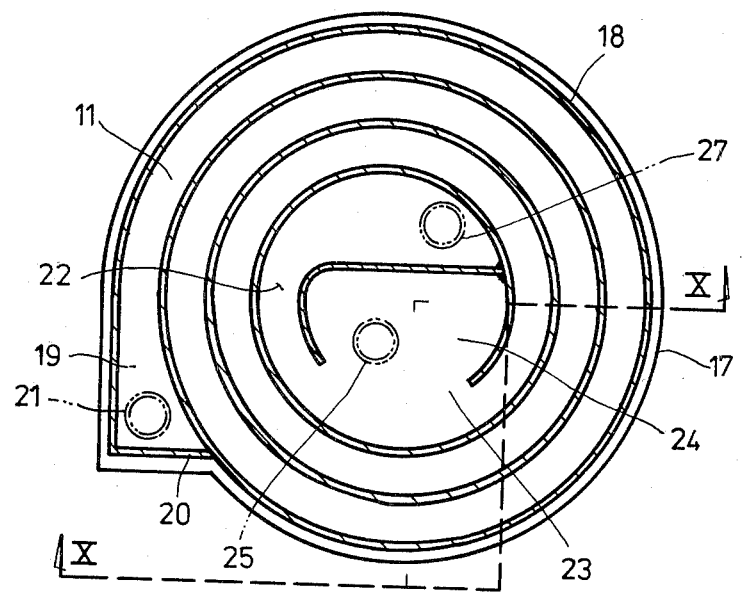
FIG. 9 is a horizontal sectional view of a third embodiment of the present invention.
Figure 10:
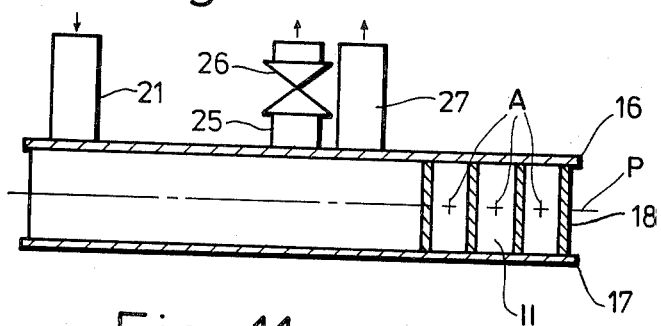
FIG. 10 is a partial cross section elevation view looking in the direction of the line X—X of FIG. 9.

The inner end of the strip 18 is bent radially and joined to the innermost turn as best shown in FIG. 9 so that the inner end 22 of the spiral passage 11 is closed. The last turn of the strip 18 is partly cut out at 23 adjacent to the closed end 22 so that a bubble trapping compartment 24 is defined. This bubble compartment 24 is communicated with a bubble drain pipe 25 which is extended upright through the top plate 16 and has a valve 26. The closed end of the spiral passage 11 is communicated with an outlet pipe 27 extended upright through the top plate 16.

The upper and lower edges of strip 18 may be welded to the top and bottom plates 16 and 17 (FIG. 10) or tightly joined with bolts and nuts and seals (not shown).

When the liquid entraining bubbles flows through the spiral passage 11, the bubbles are forced to flow along the radially inward walls of the passage 11 under the centrifugal forces and finally into the bubble trapping compartment 24. The bubbles swirl in the compartment 24 while rising and flowing into the outlet pipe 25. The valve 26 is provided in order to control the flow rate of the liquid discharged out of the system together with the separated bubbles. The liquid free from bubbles flows into the closed end 22 and then into the outlet pipe 27.

In the second or third embodiment described above with reference to FIGS. 6 through 8 or FIGS. 9 and 10, the spiral liquid passage is disposed horizontally and the liquid entraining bubbles enters into the passage from its outer end and flows out from its inner end adjacent to the center of the helical passage 11, but it is to be understood that the helical liquid passage can be disposed in any position. For instance, the liquid passage may be in the form of a conical helical spring (not shown). In addition, the inlet may be the inner end of the spiral passage while the outlet may be the outer end, but the bubble trapping slit or window must be formed through the radially inwardly wall of the passage.

Figure 11:
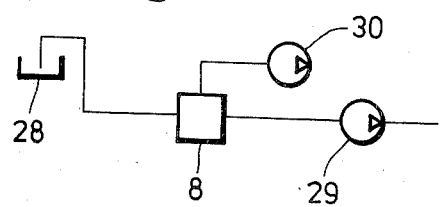
FIG. 11 is a flow chart of another production line in which is incorporated the gas-liquid separator of the present invention.

FIG. 11 shows a flow chart of a system incorporating a gas-liquid separator 8 in accordance with the present invention. The liquid flows from a tank 28 past the gas-liquid separator 8 into a pump 29. The liquid discharged from the pump 29 is used for lubrication, cooling or actuating hydraulic actuators. Even when bubbles are entrained in the liquid, they are separated by the gas-liquid separator 8 so that the pump 29 and its succeeding equipment are prevented from being damaged by bubbles. Degradation in quality of the final products can be avoided. Since the suction side of the pump 29 is in general at negative pressure, it becomes difficult to drain the entrapped bubbles from the separator 8. Therefore, any suitable device capable of establishing a evacuating vacuum suction such as a vacuum pump or aspirator 30 is used to drain the entrapped bubbles. Alternatively, the head of the tank 28 is sufficiently raised so that the entrapped bubbles are forced to flow out of the separator 8.

In summary, according to the present invention, the liquid with entrained bubbles is forced to flow through the spiral passageway with the bubble trapping or separating holes formed through the radially inward wall. As a result, the bubbles entrained in the liquid are forced to flow along the radially inward inside wall and enter the bubble trapping holes, whereby the entrained bubbles are separated from the liquid.

The effects, features and advantages of the bubble separator in accordance with the present invention may be summarized as follows:

(i) The bubble separator of the present invention is small in size, simple in construction yet capable of bubble separation with high efficiency.

(ii) Because of the centrifugal separation, the complete removal of the bubbles entrained even in a liquid having a high degree of viscosity is assured. The bubble separation from water, chemical solution, coating agents or working liquids in hydraulic control systems becomes very simple. As a result, malfunction and breakdown of the hydraulic control system can be avoided; noise may be suppressed; oxidation of the working liquid can be avoided; the reduction in operation efficiency may be avoided; and the working liquid itself may be reduced in volume.

(iii) Wear of the bubble separator due to the abrasive particles entrained in the liquid is almost negligible.

(iv) When the bubble separator of the present invention is applied to a coating machine as described above with reference to FIG. 5, the bubbles entrained in the coating liquid or the like can be completely separated because of (i) and (ii). As a result, degradation in quality due to the presence of bubbles of the final products can be prevented. When the bubble separator is incoporated in the lubrication system, seizure of rubbing parts due to the presence of bubbles in the lubricant can be avoided. When the bubble separator is used to separate the bubbles entrained in the hardening liquid, the hardened parts may be prevented from having nonuniform structures. When the bubble separator is used for separating the bubbles entrained in a drug which is in the liquid form and is to be applied to bases or substrates, uniform application of the drug is assured.

(v) Because of (ii), the overall quantity of the fluid flowing through the system can be reduced and consequently the tank capacity can be reduced.

(vi) Bubbles entrained even in solid solutions or viscous liquids can also be removed so that the qualities of the products can be remarkably improved.

What is claimed is:

1. A centrifugal separator for separating gas bubbles from a liquid in which such bubbles are trapped comprising:

a flow structure having an inlet for admitting a liquid having entrapped gas bubbles and comprising a top plate, a bottom plate parallel thereto and a strip spirally coiled between and having the edges thereof joined to said top and bottom plates, the inner end of said strip being joined to the innermost turn of said strip so as to define between the inner and outer ends of said strip a spiral passage having inlet and outlet ends and a central axis in a single plane and being of substantially uniform rectangular cross section and for a major portion of its length being bounded by imperforate walls defined by said plates and strip and confined between parallel planes defined by said plates and parallel to said single plane, whereby to subject the liquid received through said inlet to flow pattern forming a vortex and in which flow pattern separation is achieved by the liquid of relatively high specific gravity being centrifugally forced toward and confined by radially outward portions of said passage during travel along a major portion of the length thereof enabling the said gas bubbles of relatively low specific gravity to be forced toward and confined by radially inward portions of said passage during travel along said major portion of the length thereof, said inner end of said strip comprising a radially inward portion and being partially cut out to provide an opening in said radially inward portion near the outlet end of said passage so as to form a bubble trapping compartment adjacent said opening, said compartment communicating with a first outlet for removing bubbles separated from said liquid after travel along said major portion of the length thereof, and a second outlet communicating with said outlet end of said passage for removing the liquid free of those bubbles removed at said first outlet.

* * * * *